United States Patent
Sach et al.

[15] 3,642,513
[45] Feb. 15, 1972

[54] OXIDATIVE HEAT TREATMENT OF CARBON FIBERS

[72] Inventors: Roger Stuart Sach, Wantage; John Bromley, Abingdon, both of England

[73] Assignee: United Kingdom Atomic Energy Authority, London, England

[22] Filed: Jan. 2, 1969

[21] Appl. No.: 788,609

[30] Foreign Application Priority Data

Jan. 3, 1968  Great Britain...................524/68

[52] U.S. Cl..................................106/307, 23/209.1, 260/37
[51] Int. Cl....................C09c 1/44, C08g 51/10, C01b 31/07
[58] Field of Search....................23/209.1, 209.2; 106/307; 260/37

[56] References Cited

UNITED STATES PATENTS

| | | | |
|---|---|---|---|
| 2,828,231 | 3/1958 | Henry | 134/1 |
| 3,304,148 | 2/1967 | Gallagher | 23/209.1 X |
| 3,333,926 | 8/1967 | Moyer et al. | 23/209.1 |
| 3,476,703 | 11/1969 | Wadsworth et al. | 23/209.1 X |

*Primary Examiner*—Edward J. Meros
*Attorney*—Larson, Taylor and Hinds

[57] ABSTRACT

Carbon fibers are heat treated in an oxygen-containing atmosphere including a gaseous inhibitor which inhibits the reaction between carbon and oxygen by reducing the activation energy of the carbon for oxidation to improve the surface characteristics of the carbon fibers for bonding purposes in a fiber-resin composite. Example of inhibitors are halogens, sulfur dioxide, and halogenated hydrocarbons such as carbon tetrachloride, chlorine being preferred.

6 Claims, No Drawings

OXIDATIVE HEAT TREATMENT OF CARBON FIBERS

The present invention relates to the treatment of fibrous material and more particularly to the treatment of carbon or graphite fibers.

It will be known that carbon fibers may be made by taking fibers of an organic material, such as polyacrylonitrile, and subjecting them to high temperatures. Very often the heat treatment is effected in several steps in different atmospheres and the final temperature may be in the range 1,500° to 2,600° C. so that the fibers may be at least partially graphitized. However, for convenience, the term "carbon fibers" is used inclusively hereinafter. These carbon fibers may have many uses, but one use is to reinforce a matrix, more particularly a matrix of plastics material, in order to produce a reinforced or laminated material in rather a similar way to that in which glass fiber is used to reinforce plastics material. One difficulty that has been found is that poor adhesion may occur between the carbon fibers and the matrix which leads to reduced mechanical strength of the composite.

In order to overcome the above difficulty, it has hitherto been proposed to apply a surface oxidation treatment to the carbon fibers after production, but we have found that if this treatment is carried out in air or oxygen it is extremely liable to cause runaway oxidation and/or pitting either of which materially weaken the carbon fibers. It has also been proposed in our British application No. 525/68 filed Jan. 3, 1968 to effect the oxidation in a liquid medium.

It is an object of the present invention to provide a process for improving the surface characteristics of carbon fibers thereby to improve the adhesion between them and a matrix, e.g., of plastics material.

According to the present invention carbon fibers are surface treated in a mixture of oxygen and an inhibitor at an elevated temperature.

It should be understood that gaseous diluents for the oxygen may be used and specifically that the oxygen may be used in the form of air.

The term "an inhibitor" is used herein to define an element or compound which is gaseous at the treatment temperature or decomposes to give such an element or compound, and which at least partially inhibits the reaction between carbon and oxygen by reducing the activation energy of the carbon for oxidation. Typical examples of such inhibitors are sulphur dioxide, halogens, halogenated hydrocarbons, e.g., carbon tetrachloride, and the like; we prefer to use chlorine.

The proportion of chlorine is most conveniently up to 1 percent by volume and about one-half percent by volume gives very satisfactory results. The temperature of treatment is very desirably in the range 500°–1,000° C.

In the hitherto proposed oxidation treatment using pure oxygen or air the temperature used has been of the order of 600° C. and under those circumstances the activation energy for oxidation of the carbon fibers is about 47 K cals. Above 600° C. and in the presence of chlorine the activation energy falls to about 24 K cals.

Consequently the use of a relatively high temperature, e.g., 950° C., is desirable because a change of about 20° C. in the actual temperature of the furnace will only cause a small change in the oxidation rate. The reason is that the activation energy is lower as above explained and furthermore the ratio of temperature differences is smaller. We have found, for example, that a change of 20° C. at 500° C. in oxygen or air (in the absence of an inhibitor) causes a change of approximately 220 percent in the oxidation rate, but on the other hand a change of 20° C. in temperature of 950° C. using an oxygen/chlorine mixture only causes a 15 percent change in oxidation rate.

We have found it convenient to continue the oxidation treatment for such time as to give a burn-off of up to approximately 3 percent by weight. In practice, we prefer to carry out the oxidation treatment on a continuous basis and to measure the carbon monoxide and carbon dioxide content of the off-gases to ensure that the required degree of oxidation is taking place.

If there is gross surface contamination of the carbon fibers, it may be convenient to pretreat them with a conventional cleaning solvent in order to remove it and in this pretreatment stage it is desirable to make use of ultrasonic agitation in order to ensure good contact between the cleaning solvent and the fibers.

In order that the present invention may more readily be understood one embodiment of the same will now be described by way of example.

In this embodiment of the invention a batch of carbon fibers was taken and was immersed in a cleaning solvent, such as chloroform or 1,1,1-trichloroethane, and was subjected to ultrasonic agitation at 13 kHz. for 10 minutes. It was found that this treatment removed approximately 0.25 percent by weight of particulate material. After treatment the fibers were removed from the bath and dried in a cool oven to remove all traces of the solvent.

A continuous fiber tow of this cleaned material was then continuously pulled through a 1.25 foot long furnace which was maintained at 950° C. The rate of movement of the fiber as 1 foot per minute and the atmosphere in the furnace was air containing 0.5 percent by volume of chlorine. The off gases from the furnace were monitored by measuring the carbon monoxide and carbon dioxide production and it was found that under these conditions a burn-off of approximately 3 percent by weight occurred.

After treatment the fibers were examined and it was found that no pitting had occurred either at impurities or fibril-fibril interfaces, both these defects having been observed in fibers which had been treated in air or oxygen without the presence of chlorine.

The carbon fibers were then incorporated into a matrix formed by an epoxide resin in the proportion of 55 percent by volume and the resulting composite was tested in a 3-point bend test on a 1-inch beam. The interlaminar sheer strength of the composite was approximately 7,200 p.s.i. which compares with a strength of 2,000 to 3,000 p.s.i. for a similar laminate made from untreated fibers.

We claim:

1. A method of surface treating carbon fiber by heating the fiber in an oxygen-containing oxidizing atmosphere at a temperature in the range 500°–1,000° C. for a time sufficient to give a burn-off of the surface sufficient significantly to improve the surface characteristics of the fiber for bonding purposes in a fiber-resin composite, the oxidizing atmosphere including a proportion of a gaseous inhibitor which not only dilutes the oxidizing gas in said atmosphere but also inhibits the reaction between carbon and oxygen by reducing the activation energy of the carbon for oxidation, the amount of said inhibitor being sufficient to substantially reduce activation energy.

2. A method as claimed in claim 1, wherein the inhibiting gas is selected from the group consisting of halogens and sulphur dioxide.

3. A method as claimed in claim 2, wherein the inhibiting gas is chlorine present in an amount of up to 1 percent by volume.

4. A method as claimed in claim 3 wherein the oxidizing atmosphere is air containing one-half percent by volume of chlorine.

5. A method as claimed in claim 1, wherein the treatment is such as to give a burn-off up to about 3 percent by weight.

6. A method as claimed in claim 1, wherein the fiber is passed continuously through a furnace containing said gaseous mixture, the rate of movement of the fiber through the hot zone of the furnace at the required temperature being such as to result in a dwell time at the temperature sufficient to give the required degree of burn-off.

* * * * *